(12) United States Patent
Rezaaifar et al.

(10) Patent No.: US 7,346,706 B2
(45) Date of Patent: Mar. 18, 2008

(54) EQUIVALENT MULTIPLE PATH TRAFFIC DISTRIBUTION IN COMMUNICATIONS NETWORKS

(75) Inventors: Ehsan Rezaaifar, Kanata (CA); Yuri Bassin, Kanata (CA)

(73) Assignee: Alcatel, Paris (FR)

( * ) Notice: Subject to any disclaimer, the term of this patent is extended or adjusted under 35 U.S.C. 154(b) by 1018 days.

(21) Appl. No.: 10/427,938

(22) Filed: May 2, 2003

(65) Prior Publication Data

US 2004/0235480 A1    Nov. 25, 2004

(51) Int. Cl.
*G06F 15/173* (2006.01)
*G06F 15/16* (2006.01)

(52) U.S. Cl. .................. 709/239; 709/238; 709/217; 709/240; 709/241

(58) Field of Classification Search ............... 709/206, 709/231–237, 217–219, 238–241
See application file for complete search history.

(56) References Cited

U.S. PATENT DOCUMENTS

| | | | | |
|---|---|---|---|---|
| 5,596,719 A | * | 1/1997 | Ramakrishnan et al. | .... 709/241 |
| 5,596,722 A | * | 1/1997 | Rahnema | ................ 709/241 |
| 6,363,319 B1 | * | 3/2002 | Hsu | ..................... 709/241 |
| 6,721,800 B1 | * | 4/2004 | Basso et al. | ............... 709/239 |
| 6,834,310 B2 | * | 12/2004 | Munger et al. | ........... 709/232 |

OTHER PUBLICATIONS

Perros, Harry. Computer Simulation Techniques: The definitive introduction! Chapter 2. pp. 22-30. Copyright 1999.*
Kaklamanis, Christos et al. "Simple Path Selection for Optimal Routing on Processor Arrays." Proceedings of the 4th Annual ACM Symposium on Parallel Algorithms and Architectures. Jun. 1992. ACM Press. 23-30.*
Su, Xun et al. "Dynamic Multi-Path Routing: Asymptotic Approximation and Simulations." ACM SIGMETRICS 2001. Jun. 2001. ACM Press. 25-36.*
Wang, Zheng et al. "Analysis of Shortest-Path Routing Algorithms in a Dynamic Network Evironment." ACM SIGCOMM Computer Communication Review. 63-71. ACM Press. Apr. 1992.*
Papadimitratos, Panagiotis et al. "Path Set Selection in Mobile Ad Hoc Networks." MOBIHOC 2002. Jun. 9-11, 2002. ACM Press. 1-11.*
Sridharan, Ashwin et al. "Achieving Near-Optimal Traffic Engineering Solutions for Current OSPF/IS-IS Networks." INFOCOM 2003. 22nd Annual Joint Conference of the IEEE Computer Communications Societies. Mar. 2003. vol. 2. 1167-1177. IEEE Press.*

* cited by examiner

*Primary Examiner*—Jason Cardone
*Assistant Examiner*—Jeffrey R Swearingen
(74) *Attorney, Agent, or Firm*—Jim Zegeer (57) ABSTRACT

A method and associated device for selecting one of a number of equivalent paths in forwarding a network message from a node of a communication network. A source and destination address is provided for the network message. The addresses are formed of individual bit values, and these values have a relative mapping between them. The relative mapping is decorrelated to obtain a decorrelated address pair. A randomized selection function is applied to the decorrelated address pair to produce an index which is derived from the relative sequence of bit values of the decorrelated address paid. The index is then used to select one of the equivalent paths. The associated device provides an address reader, a decorrelation module and a randomized selection module for performing the method previously described.

30 Claims, 4 Drawing Sheets

EQUIVALENT MULTIPLE PATH TRAFFIC DISTRIBUTION IN COMMUNICATIONS NETWORKS

FIELD OF THE INVENTION

The present invention relates generally to the field of networked communications and more particularly, to a method and apparatus for the selection, forwarding and distribution of network traffic across equivalent multiple links, paths or path segments to a desired destination.

BACKGROUND OF THE INVENTION

It is often times desirable in communications networks to attempt to equalize the distribution of traffic across network nodes so as to alleviate network congestion and in order to promote the utilization of network resources as cost-effectively as possible. Typically, one will be met with the task of forwarding or distributing network traffic from a source and to a destination across multiple links, paths or path segments that are equivalent or which may be deemed to be equivalent to one another. For instance, such equivalent multiple links, paths or path segments may be characterized by having the same or a comparable cost of transmission to a given destination. As used in this specification, an equivalent path will signify a link, path or path segment that is considered to have one or more identical or similar transmission attributes to an alternative link, path or path segment. Likewise, an equivalent path as used herein will denote a link, path or path segment that will produce identical or similar traffic consequences if deployed in substitution for an alternative link, path or path segment.

In the particular case of networks that employ connectionless network protocols, for example in Internet Protocol (IP) networks, circumstances will routinely arise where traffic must be forwarded to a destination through a network node which possesses equivalent paths known as equal cost multiple paths (ECMPs). One factor which promotes the availability of ECMPs in these networks is that network links, paths or path segments are many times assigned the same default cost by existing forwarding protocols such as Open Shortest Path First (OSPF), Border Gateway Protocol (BGP) or Intermediate System—Intermediate System (ISIS). In forwarding traffic at and from each node within connectionless protocol networks, it therefore becomes a requirement to select among any number of available ECMPs. Such selection must be undertaken while attempting to meet the goals previously mentioned of minimizing network congestion and of promoting an effective utilization of network resources.

To maintain packet ordering in connectionless network protocols, it is desirable for packets belonging to the same flow to be forwarded over the same source-to-destination path. In other words, packets having the same source address and destination address are typically forwarded over the same path so as to preserve packet sequencing. To this end, a router or other network node will employ the source and destination addresses of a packet in order to select the next path segment where there exist a number of available ECMP segments towards the relevant destination of the packet. Typically, a randomized selection function is provisioned to operate on the source and destination addresses of each packet for the purpose of generating a path pointer that is associated with an available ECMP. The randomized selection function in question is intended to produce a distribution of packed traffic mere or less evenly among multiple ECMP segments at each network node.

An example of a randomized function used for path selection is a hashing function or algorithm, as is well known to those skilled in this art. Since such functions or algorithms will make use of the source and destination addresses of each packet in order to achieve path selection, packets associated with the same traffic flow will be forwarded along the same downstream path segment at a given node of the network, thereby preserving packet sequencing. Where packets are associated with different traffic flows, the random nature of hashing functions or algorithms that are employed for path selection will generally promote the desired result of distributing traffic of different flows equally among all available ECMP segments at a given network node.

One phenomenon, known to those in this art as ECMP polarization, occurs at the network level with the use of path selection routines such as the hashing functions or algorithms described above. In theory, the random nature of hashing functions or algorithms, together with the relative uniqueness of each source and destination address pair for a given traffic flow, should promote the tendency to distribute network traffic evenly among all ECMP segments at each network node along a traffic path. In practice, however, a subsequent node in a network could very well employ the identical hashing function or algorithm as its predecessor. For instance, this may occur where network equipment at two contiguous nodes in a network are provided by the same vendor. If an identical hashing function or algorithm is so employed, the use of a given source and destination address pair with the same hashing function or algorithm will result in the selection of an identical path pointer in the subsequent node as was the case with its predecessor. For instance, a first node may result in the selection of a particular path pointer based upon a specific hashing function or algorithm and address pair. Such a path pointer may be associated with the third ECMP segment among those that are available for selection by the first node. A second node downstream from the said first node may employ the same hashing function or algorithm as the first node. For the same traffic flow as identified by address pair, then, this second node will select the identical path pointer as the first node. Once again, this could be associated with the third ECMP segment of those which are available for selection by the second node. As a result, network traffic in this example would be forwarded in the same manner on two adjacent nodes of the network. Namely, each of the nodes of this example will generate the same path pointer that will be associated with the respective third ECMP path segment available to the nodes. This will produce a polarized traffic distribution for the two nodes in question. In the extreme, all nodes along a path could potentially exhibit this same behavior, resulting in polarization across the entire source-to-destination path.

It has been known to attempt to design network configurations with different hashing functions or algorithm at the nodes thereof as a means of addressing the phenomenon of network polarization. However, this known solution would have the disadvantage that all affected nodes of the network would require different software or hardware to be loaded therewith. This would raise obvious inconvenience for equipment vendors. Another attempted solution may have involved the injection of a mathematical constant or variable within existing hashing functions or algorithms to render them mathematically unique from one another across various nodes within a network. However, those skilled in this art will understand that such an approach would not necessarily resolve the occurrence of traffic polarization, since all such existing hashing algorithms will utilize a source address and a destination address as its expected mathematical inputs, and such known functions or algorithms may very well produce a given repeatable pattern of path selection for the same address pairs notwithstanding the injection of a unique mathematical constant or variable as aforesaid.

It is therefore an object of the present invention to attempt to reduce or alleviate the problem of polarized network traffic distribution where one or more nodes within a communications network possess multiple equivalent path segments for forwarding network traffic.

SUMMARY OF THE INVENTION

According to a first broad aspect of the present invention, there is provided a method of selecting one of a plurality of equivalent paths for forwarding a network message from a network node of a communications network, the method comprising the steps of: providing a source address and a destination address for the network message, the source address and the destination address being respectively comprised of individual bit values, the individual bit values having a relative mapping as between the source address and the destination address; decorrelating the relative mapping of individual bit values as between the source address and the destination address to obtain a decorrelated address pair; applying a randomized selection function to the decorrelated address pair, wherein the randomized selection function thereby produces an index which is derived from a relative sequence of bit values pertaining to the decorrelated address pair and for selecting said one of the plurality of equivalent paths by means of the index.

According to a second broad aspect of the present invention, there is provided a network apparatus for selecting one of a plurality of equivalent paths for forwarding a network message from a network node of a communications network, the apparatus comprising: an address reader for deriving a source address and a destination address of said network message, the source address and the destination address being respectively comprised of individual bit values, the individual bit values having a relative mapping as between the source address and the destination address; a decorrelation device for decorrelating the relative mapping of individual bit values as between the source address and the destination address to obtain a decorrelated address pair, and a randomized selection device for producing an index which is derived from a relative sequence of bit values pertaining to the decorrelated address pair and for selecting said one of the plurality of equivalent paths by means of the index.

BRIEF DESCRIPTION OF THE DRAWINGS

By way of illustration and not of limitation, embodiments of the present invention are next described with reference to the following drawings in which.

DETAILED DESCRIPTION OF EMBODIMENTS OF THE INVENTION

Figure 1:
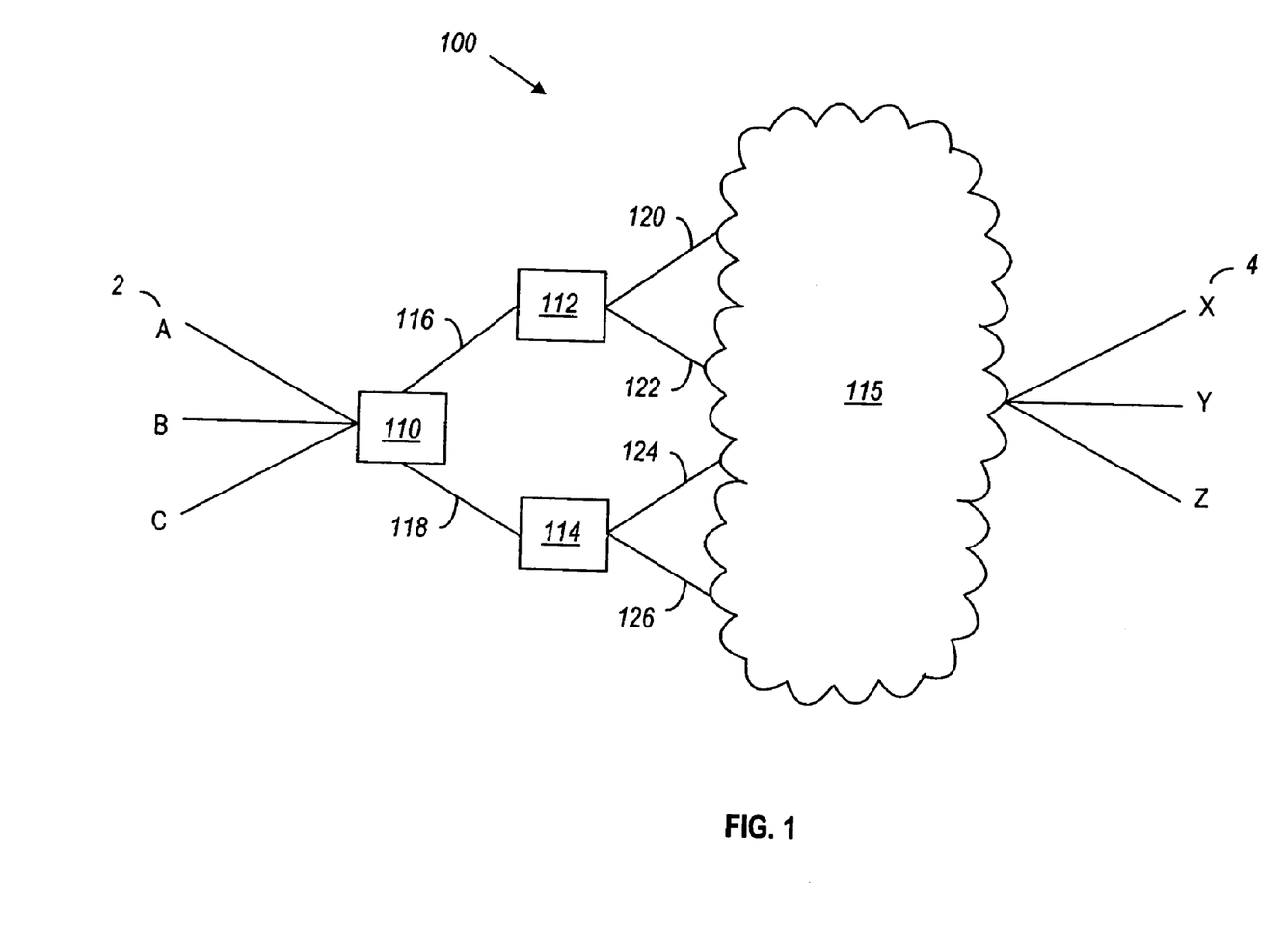
FIG. 1 is a schematic diagram of a communications network within which embodiments of the present invention may be deployed.

The present invention may be deployed as shown in FIG. 1 within a communications network 100, for instance a network operating according to connectionless forwarding protocols. By way of example, a connectionless forwarding protocol may be one that is compliant with Internet Protocol (IP) addressing standards. Communications network 100 has nodes 110, 112 and 114, together with a backbone cloud 115.

Figure 2:
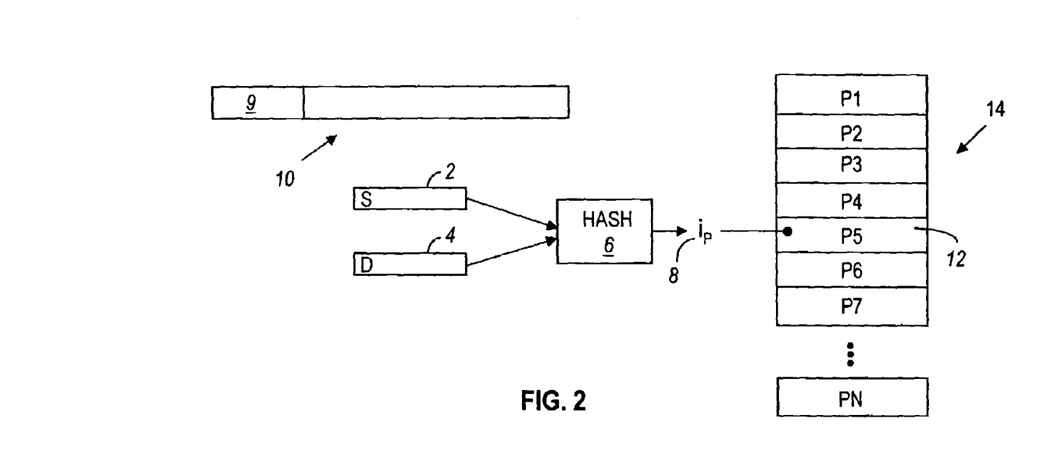
FIG. 2 is a process diagram illustrating the prior art method of equivalent path segment selection using a path selection randomization algorithm such as a hashing function.

With reference also to FIG. 2, there is shown schematically the process as known in this art of hashing a source address 2 (denoted "S") and a destination address 4 (denoted "D") by way of a hashing algorithm or function 6 so as to generate a path index 8 (denoted "$i_p$"). The source and destination addresses 2, 4 may for instance be extracted from the header 9 of a network message or other datagram, such as an IP packet 10. The path segment index 8, as generated by the hashing algorithm or function 6, is utilized for the selection of an available message path segment 12. For instance, message path segment 12 may be an equivalent path segment (such as the message path denoted "$P_5$") chosen from one of a plurality of equivalent path segments (denoted as the message paths "$P_1$" to "$P_n$") found on a forwarding table 14 that is associated with a given node of communications network 100, such as node 110. The path segment index 8 points to a specific equivalent path segment of forwarding table 14. Although the specific example of a hashing function or algorithm 6 is provided herein, those skilled in the art will appreciate that other suitable path selection randomization functions or algorithms may form part of prior art knowledge, and comprise any randomized selection function which operates on the source address and destination address of a network message to generate an index or other numerical pointer for the selection of available equivalent paths.

It was mentioned previously that where source addresses 2 and destination addresses 4 are hashed as aforesaid according to known techniques in the art, the problem of network polarization may manifest itself. In FIG. 1, each of nodes 110, 112 and 114 are assumed to be sourced from the same equipment vendor and therefore each adopt the same path segment selection methodology for forwarding network traffic. Node 110 presents downstream equivalent path segments 116 and 118. Node 112 possesses downstream equivalent path segments 120 and 122, with Node 114 having downstream equivalent path segments 124 and 126. In the illustrative example of FIG. 1, source addresses 2 comprise the addresses "a", "b" and "c", whereas destination addresses 4 comprise the addresses "x", "y" and "z". Where a network message such as an IP packet 10 has the source address "a" and a destination address "x", it will be assumed by way of example that the path segment selection of node 110 according to the prior art will select path segment 118. Moreover, since the same path segment selection algorithm will be found on each of nodes 112 and 114, these nodes will likewise select respective path segments 122 and 126. In the particular network architecture of the communications network 100, the path segments 122 and 126 are analogous to the path segment 118 as selected by the selection algorithm of node 110. Thus, in each of the nodes 112 and 114, the selected path segments for IP packets 10 having the source address "a" and the destination address "x" will exhibit a polarization of the network traffic emanating from those same nodes. Other nodes (not shown) downstream of the nodes 112 and 114 will in the same manner as previously described produce a similar polarized traffic distribution behavior.

To further emphasize the problem of network polarization with reference to the communications network 100 of FIG. 1, those skilled in the art will appreciate that if any or all traffic flows that are forwarded to one of the destination addresses x, y or z are directed from node 110 through path segment 118, those same flows will be directed from node 114 through the analogous path segment 126. Likewise, if any or all traffic flows that are forwarded to one of the destination addresses x, y or z are instead directed from node 110 through path segment 116, those same flows will be directed from node 112 through the analogous path segment 120. Thus, the net practical effect of polarized traffic distribution in the example above is that the path segments 122 and 124 will not be utilized for forwarding flows intended for the destination addresses x, y or z.

Figure 3:
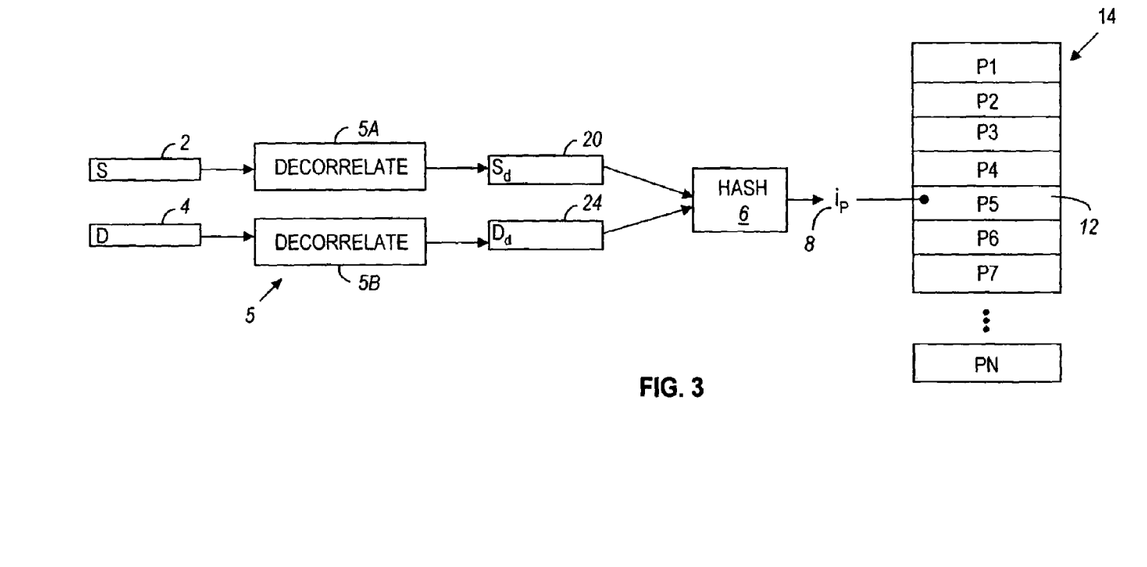
FIG. 3 is a process diagram illustrating equivalent path segment selection according to an embodiment of the present invention.

Turning now to FIG. 3, the method according to the present invention involves the addition of a preprocessing step as at 5 which operates on at least one of the source address 2 and destination address 4 prior to introducing same to a randomized selection function such as the hashing function 6. Randomized selection functions as known in this art operate to produce an index for path selection which is derived from a relative sequence of bits as between a source address and a destination address. In its broad aspect, the preprocessing step 5 decorrelates the relative mapping of bits as between the source address 2 and destination address 4 (again denoted as "S" and "D", respectively), and this is shown schematically by the respective decorrelation functions 5a and 5b. The decorrelation functions 5a and 5b respectively produce a decorrelated address pair comprising source address 20 and destination address 24 (each denoted respectively as $S_d$ and $D_d$). The decorrelated address pair then substituted for the source address 2 and the destination address 4 as the expected inputs to the hashing function 6. The hashing function 6 then operates as per the prior art to generate a path segment index 8 which in turn is utilized as a pointer to the forwarding table 14 that contains all available equivalent path segments for the particular network node for which path segment selection is talking place. Once a path segment has been selected as aforesaid, the decorrelated address pair need no longer utilized, since the addressing protocol of the network 100 will make use of unaltered source address 2 and destination address 4 for traffic forwarding purposes downstream of the node for which path segment selection has already taken place.

According to an embodiment of the present invention, decorrelation of the source address 2 and the destination address 4 can be achieved by any function which operates on the bit values associated with at least one of the said addresses so that the relative sequencing, positional interrelation or positional mapping of bits as between the source address 2 and the destination address 4 is varied. The foregoing may moreover be accomplished while retaining the sum of the individual bits associated with each such address. By way of example, in an embodiment of the present invention, this may be achieved by way of a predetermined shuffling or predetermined scrambling of the bit values of at least one of the source address 2 and destination address 4, so as to achieve the desired change in the relative positions of bits therebetween. Moreover, as explained by way of example below, the decorrelation of bit values as aforesaid may be associated with one or more decorrelation parameters that can be randomly assigned for each node of a communications network 100. Such decorrelation parameters may therefore be node-specific. This is intended to increase the likelihood that the individual hashing functions 6 associated with each node along a source-to-destination path in a network will not operate on the identical decorrelated pair of source and destination addresses, thereby avoiding the likelihood of traffic polarization.

Figure 4:
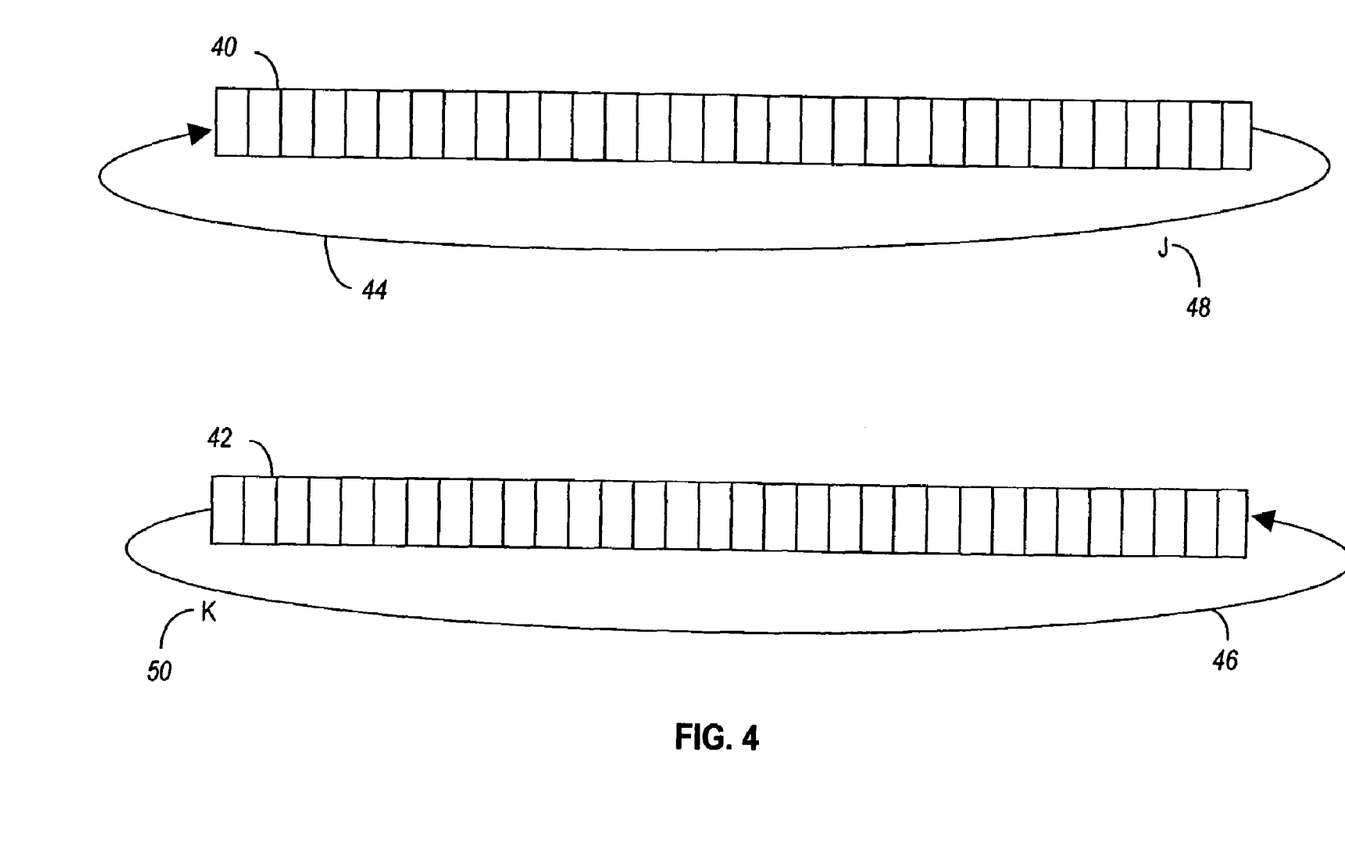
FIG. 4 depicts a source address and a destination address for which decorrelation of the respective bit values thereof is performed in accordance with an embodiment of the present invention.

With further reference to FIG. 4, there is shown an embodiment of the present invention whereby the decorrelation of the source address 2 and destination address 4 is achieved by way of bit rotation. By way of example, there is shown a 32-bit source address 40 and a 32-bit destination address 42 in accordance with the IP v4 addressing scheme known to those in this art. The bits comprised in the source address 40 are shown as being rotated in a notional clockwise direction as at 44. The number of bits so rotated may be defined by a decorrelation parameter in the nature of a rotation parameter 48 (denoted "j"). Where it is desired to rotate the bits comprised in the destination address 42 in addition to those of the source address 40, a second decorrelation parameter in the nature of a rotation parameter 50 (denoted "k") may be employed to define such rotation in respect of the destination address 42. According to an embodiment of the present invention, rotation of the bits comprised in the destination address 42 may be executed in a direction opposite to that employed in respect of the source address 40, for instance in the notional counterclockwise direction at 46.

Where 32-bit addressing is encountered, the rotation parameters 48 and 50 may each comprise a 4-bit value. This is to reflect a numerical value which may produce up to 16 bits of possible rotation in either of the source address 40 and destination address 44, namely one-half of the length of the 32-bit addresses in question. Where the rotation parameters are defined to have a numerical value that does not exceed one-half of the address length as aforesaid, and the bit rotation in question operates in opposite directions as previously explained, the sought after decorrelation of bits as between the source address 40 and the destination address 44 is enhanced. Each of the rotation parameters 48 and 50 may be assigned a value at node initialization, for instance by way of random generation. Such random generation may employ a timestamp as a mathematical seed for the derivation of the values of the rotation parameters 48, 50.

Where a 4-bit value is adopted for the rotation parameters 48, 50 those skilled in this art will appreciate that there may still remain some finite likelihood that a contiguous network node will produce the same path index 8 as its predecessor node, although such likelihood is well reduced when compared to a path segment selection routine where decorrelation of the source and destination addresses does not take place prior to hashing. To account for this possibility that a contiguous network node may produce the same path index as its predecessor node, refresh values for decorrelation parameters may be generated by or supplied to the affected network node in replacement of the values earlier assigned to the node. For instance, this refresh provision of decorrelation parameters can be implemented to take place at predetermined intervals. However, those skilled in this art will understand that refreshing of the decorrelation parameters periodically as aforesaid can be expected to modify traffic forwarding behavior within a network, and should therefore be approached with care. Moreover, where various network nodes are provisioned with such periodic refreshing of decorrelation parameters, it may be advisable to have differing refresh intervals applicable to those nodes so as to decrease the duration over which any nodes may possibly possess the very same refresh parameters. For the foregoing reasons, it would be preferable for the provision of refresh decorrelation parameters to be undertaken only as required where traffic patterns within a given network configuration are detected to be exhibiting the characteristics of polarization as described previously.

Figure 5:
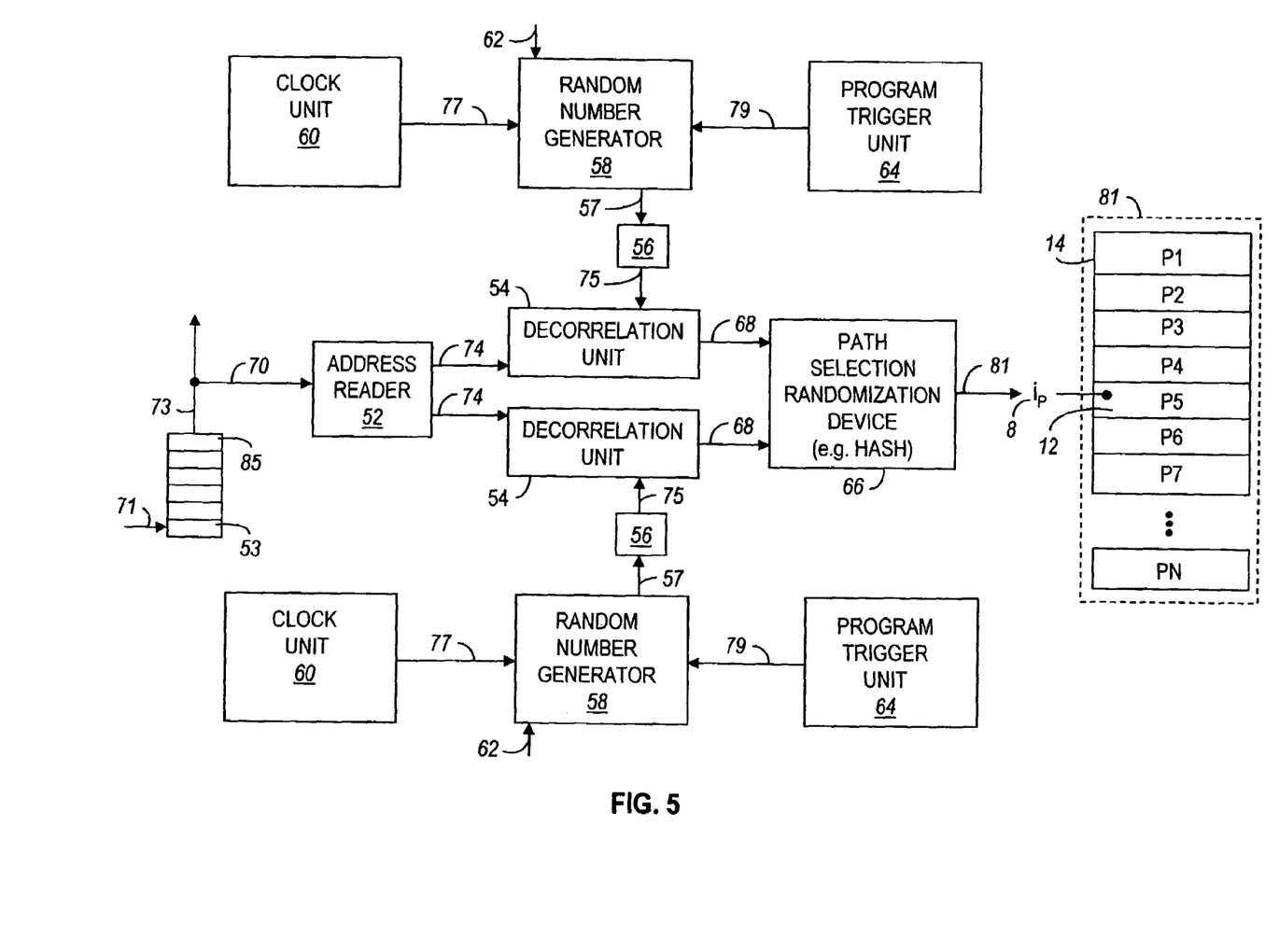
FIG. 5 is a system block diagram which illustrates an exemplary network router according to an embodiment of the present invention.

With reference now to FIG. 5, there is next described a network apparatus such as a network router 51 in which an embodiment of the invention is implemented by way of example. The network router 51 may comprise an address reader 52 for reading at least one of the respective bit values of the source address 2 and destination address 4 from a header 9 of a network message such as an IP packet 10. The address reader 52 may derive its address information as at 70 from network messages that are stored in a memory which is configured as a downstream message buffer 53. For instance, the network message in question maybe network message 85 that is located at head of queue within the downstream message buffer 53. The downstream message buffer 53 may be provisioned locally of address reader 52 or if desired, may form part of the ingress buffering for the router 51. Downstream message buffer 53 receives its input of network messages as at 71 and produces its output thereof as at 73, from which output the address reader derives its address information as aforesaid. The output of downstream message buffer 53 may be directed as at 73 towards the forwarding functions (not shown) of the network router 51, as well known to this art.

One or both of the bit values of the source address 2 and destination address 4 may be input from the address reader 52 as at 74 to an associated decorrelation unit 54. Each decorrelation unit 54 serves to operate on the bit values associated with the said addresses so that the relative mapping of bits as between the source address 2 and destination address 4 is decorrelated. According to an embodiment of the present invention, the decorrelation as aforesaid may be achieved by way of varying the relative sequencing, positional interrelation or positional mapping of bits between the source address 2 and the destination address 4. Moreover, this may be performed while retaining the sum of the individual bits associated with each such address. Where it is desired to achieve decorrelation as aforesaid only by operating on the bit values pertaining to one or the other of the source address 2 and destination address 4, a single decorrelation unit 54 may be provided in the network router 51 for processing the bit values associated with the applicable address. Where decorrelation is envisaged by operating on the bit values of both the source address 2 and destination address 4, two decorrelation units 54 may be provisioned as illustrated.

In the example according to the present invention discussed earlier, the decorrelation of the source address 2 and destination address 4 is achieved by way of bit rotation. Where bit rotation is the desired mechanism according to which the decorrelation units 54 operate, the decorrelation units 54 may be implemented in hardware using shift registers or the like. This will enable the decorrelation algorithms previously described to be executed relatively quickly, for instance at the line rate of the router 51. Parameter registers 56 or the like may be utilized to store the current value of the decorrelation parameters previously described, such as the respective rotation parameters 48, 50.

One such parameter register 56 is assigned to each of the decorrelation units 54. Each parameter register 56 furnishes to its respective decorrelation unit 54 as at 75 the value of the decorrelation parameter stored therein.

As previously explained, in the case of the rotation parameters 48, 50, these parameters are utilized to define the extent of bit rotation that will be executed by each of the respective decorrelation units 54, The values of the rotation parameters 48, 50 or of any other decorrelation parameter may be furnished for instance to the parameter registers 56 by a random number generator 58 that is operatively connected thereto as at 57. Although two such random number generators 58 are shown in the embodiment illustrated, those skilled in the art will appreciate that a single random number generator 58 may service each of the parameter resister 56. It was mentioned previously that timestamp information may serve as a mathematical seed for random number generation and where this is desired, each random number generator 58 will receive such timestamp information as at 77 from a clock unit 60 or the like. Again, although two such clock units 60 have been illustrated, one being provisioned for each of the random number generators 58, those skilled in this field of art will understand that a single clock unit will suffice for this purpose.

As described earlier, refresh values for decorrelation parameters may be generated by or supplied to the affected network node in replacement of the values earlier assigned to the node. Where the refresh values are provided as deemed necessary by a network administrator or other authorized user, the random number generators may be provided with external signal triggers 62 or the like in order to initiate the generation of new correlation parameters for storage in the parameter registers 56 and in turn for use by the decorrelation units 54. Alternatively, the random number generators 58 may be called upon to generate appropriate refresh values by a signal generated as at 79 at predetermined and selectable intervals by means of a programmable periodic trigger unit 64 or the like, provisioned either for each random number generator 56 as illustrated or by means of a single such unit. The latter alternative would be deployed where it is desired to implement the refresh provision of decorrelation parameters at predetermined intervals, as previously described.

The exemplary router 51 according to an embodiment of the present invention further provides a path selection randomization such as a hashing unit 66 or the like, as well known in this art. Following decorrelation of the source address 2 and destination address 4 by the decorrelation units 54, a decorrelated address pair is produced as referred to above. The decorrelation address pair comprises source address 20 and destination address 24, which are input to the hashing unit 66 as at 68. The hashing unit 66 then operates as per the prior art to generate a path segment index 8 as at 81 which in turn is utilized as a pointer to a memory 72 or the like which implements the forwarding table 14 that was earlier described. As already explained, once a message path segment has been selected as aforesaid, the decorrelated address pair need no longer be utilized by the network router 51, since the addressing protocol of the network 100 will make use of the unaltered source address 2 and destination address 4 for traffic forwarding purposes downstream of the node for which path segment selection has already taken place. The selected message path segment 12 is then utilized by the network router 51 in order to forward the network message 85.

The present invention thus generally seeks to address the occurrence of network polarization in communications networks, particularly those operating according to connectionless forwarding protocols. This is achieved by providing a method and apparatus for distributing network traffic across equivalent path segments in a communications network. Where such network polarization can be avoided or reduced in its prevalence, network traffic congestion may at times be minimized by a more effective utilization of network resources. Moreover, network resources can be expected to be utilized more cost effectively in those instances where network traffic is found to be more evenly distributed according to the teachings of the present invention. While it is desirable to implement the teachings of the present invention to all network nodes residing in a given network configuration, the presumed benefits of the invention may potentially be felt even in networks where less than all of the network nodes thereof make use of same. Thus, nodes or equipment which deploy the apparatus or methods of the present invention may in a sense compensate for the effects of other nodes or equipment which may instead be contributing to the passage of polarized network traffic. The invention also permits a network administrator or other authorized network user to reconfigure network nodes or other network equipment that use the teachings hereof with refresh decorrelation parameters, thereby permitting a response to changes in traffic characteristics, network configuration or other factors that may be causing or contributing to an increase in traffic polarization.

Those skilled in this art will understand that various modifications of detail may be made to the method and apparatus according to the present invention, all coming within its spirit and scope.

We claim:

1. A method of selecting a path from a plurality of equal cost multiple paths (ECMP) for a datagram egressing a network node of a communications network, said datagram having a header which provides a source and a destination address, the method comprising the steps of:
   i). decorrelating individually the source address and the destination address using a node specific parameter to obtain a decorrelated address pair;
   ii). applying a randomized selection function to the decorrelated address pair to obtain a path index which is specific to said node; and
   iii). selecting said path by means of the path index.

2. The method according to claim 1, wherein the randomized selection function is a hashing function.

3. The method according to claim 1, wherein said step i) is accomplished by scrambling the individual bits of at least one of said source address and said destination address.

4. The method according to claim 1, wherein said step i) is accomplished by shuffling the individual bits of at least one of said source address and said destination address.

5. The method according to claim 1, wherein said step i) is accomplished by bit rotation of the individual bits of at least one of said source address and said destination address.

6. The method according to claim 5, wherein the bit rotation of the bits of the source address is performed in a direction that is opposite to a direction of rotation of the bits of the destination address.

7. The method according to claim 6, wherein the bit rotation is performed respectively for a predetermined number of bits in respect of each of the source address and the destination address, the predetermined number of bits being defined by a bit rotation parameter associated respectively with each of the source address and the destination address.

8. The method according to claim 7, wherein each bit rotation parameter is derived by means of a random number generator.

9. The method according to claim 8, wherein the random number generator employs a timestamp as a mathematical seed therefore.

10. The method according to claim 9, wherein the timestamp is obtained upon initialization of the network node.

11. The method according to claim 10, wherein each bit rotation parameter is re-derived dynamically subsequent to initialization of the network node.

12. The method according to claim 11, wherein each bit rotation parameter is re-derived dynamically based upon a new timestamp from that obtained upon initialization of the network node.

13. A method as claimed in claim 1, further comprising changing said node specific parameter at time intervals at predetermined and selectable intervals.

14. A network apparatus for selecting a path from a plurality of equal cost multiple paths (ECMP) for a datagram egressing a network node of a communications network, said datagram having a header which provides a source and a destination address, the apparatus comprising:
   a decorrelation device for decorrelating the relative mapping of individual bit values as between the source address and the destination address using a node-specific parameter to obtain a decorrelated address pair; and
   a randomized selection device for producing a path index which is is specific to said node.

15. The apparatus according to claim 14, wherein the randomized selection device executes a hashing function for producing the said path index.

16. The apparatus according to claim 14, wherein the decorrelation device unit decorrelates by scrambling of said individual bit values of at least one of said source address and said destination address.

17. The apparatus according to claim 14, wherein the decorrelation device decorrelates by shuffling of said individual bit values of at least one of said source address and said destination address.

18. The apparatus according to claim 14, wherein the decorrelation device decorrelates by bit rotation of said individual bit values of at least one of said source address and said destination address.

19. The network apparatus according to claim 14, further comprising a second decorrelation device, wherein each of the decorrelation devices operates on a respective source address and destination address to obtain the decorrelated address pair.

20. The apparatus according to claim 14, wherein the decorrelation device decorrelates by bit rotation of said individual bit values of each of said source address and said destination address.

21. The apparatus according to claim 14, wherein the bit rotation of the bits of the source address is performed in a direction of rotation that is opposite to a direction of bit rotation of said individual bit values of the destination address.

22. The apparatus according to claim 21, wherein the bit rotation is performed respectively for a predetermined number of bits in respect of each of the source address and the destination address, the predetermined number of bits being defined by a bit rotation parameter associated respectively with each of the source address and the destination address.

23. The apparatus according to claim 22, further comprising two parameter registers for respectively storing each bit rotation parameter.

24. The apparatus according to claim 23, further comprising a random number generator for deriving each bit rotation parameter.

25. The apparatus according to claim 24, wherein the random number generator employs a timestamp as a mathematical seed therefore.

26. The apparatus according to claim 25, wherein the decorrelation units are each implemented as shift registers.

27. The apparatus according to claim 26, further comprising a clock unit for providing the timestamp to the random number generator.

28. The apparatus according to claim 27, wherein the timestamp is provided to the random number generator and the bit rotation parameters are derived therefrom upon initialization of the network node.

29. The apparatus according to claim 28, wherein each bit rotation parameter is re-derived dynamically subsequent to initialization of the network node.

30. The apparatus according to claim 29, wherein each bit rotation parameter is re-derived dynamically based upon a new timestamp from that provided to the random number generator upon initialization of the network node.

* * * * *